United States Patent [19]

Koike et al.

[11] 4,113,838

[45] Sep. 12, 1978

[54] METHOD OF TREATING COMBUSTION EXHAUST GAS CONTAINING NITROGEN OXIDES

[75] Inventors: Sakae Koike; Shoichi Matsunami; Yorinobu Goto; Yoshio Tanabe, all of Kurashiki, Japan

[73] Assignee: Mitsubishi Chemical Industries, Ltd., Tokyo, Japan

[21] Appl. No.: 755,936

[22] Filed: Dec. 30, 1976

[51] Int. Cl.² .................. C01B 21/00; B01D 53/34
[52] U.S. Cl. ................................ 423/235; 423/351
[58] Field of Search ................ 423/235, 239, 351

[56] References Cited

U.S. PATENT DOCUMENTS

| | | | |
|---|---|---|---|
| 3,846,981 | 11/1974 | Paczkowski | 423/235 |
| 3,900,554 | 8/1975 | Lyon | 423/237 |

FOREIGN PATENT DOCUMENTS 1,388,669  3/1975  United Kingdom .................. 235/

*Primary Examiner*—O. R. Vertiz
*Assistant Examiner*—Eugene T. Wheelock
*Attorney, Agent, or Firm*—Oblon, Fisher, Spivak, McClelland & Maier

[57] ABSTRACT

A method of treating a combustion exhaust gas containing nitrogen oxides comprises:

a first step of removing nitrogen oxides by treating a mixture of the exhaust gas, oxygen and ammonia in the absence of hydrogen or in the presence of lower than 10 mole ratio of hydrogen to ammonia at a temperature from 700° C to 1300° C and a second step of adjusting a mole ratio of hydrogen to ammonia in the pretreated exhaust gas to higher than 3 and treating the mixed gas at a temperature from 490° C to 700° C.

4 Claims, No Drawings

METHOD OF TREATING COMBUSTION EXHAUST GAS CONTAINING NITROGEN OXIDES

BACKGROUND OF THE INVENTION:

1. Field of the Invention:

The present invention relates to a method of treating a combustion exhaust gas containing nitrogen oxides. More particularly, it relates to an improved method of removing nitrogen oxides to prevent a pollution by treating a combustion exhaust gas containing nitrogen oxides with ammonia in the presence of oxygen at high temperature wherein a concentration of residual ammonia in the discharged exhaust gas is remarkably reduced.

2. Description of the Prior Arts:

The exhaust gases formed in boilers for combustion of mineral oils such as heavy oils, light oils and crude oils and coals and the exhaust gases formed in internal combustion engines contain nitrogen oxides such as NO and $NO_2$ (hereinafter referring to as $NO_x$). $NO_x$ is considered to cause photochemical smog. A concentration of $NO_x$ in the combustion exhaust gas is severely regulated because of preventing the environmental pollution.

Various methods of removing $NO_x$ from combustion exhaust gases have been proposed. As a typical method, the methods of using the solid catalysts have been known. These methods are not always effective in industrial operations because the catalysts are expensive; the apparatus for contacting the gas with the catalyst in high efficiency is required, and the exchange and recovery of the catalyst is periodically required.

In order to overcome these disadvantages, various methods of removing $NO_x$ without using the solid catalyst, have been studied. As the result, the method of selectively reducing $NO_x$ in the presence of ammonia and oxygen, has been proposed (U.S. Pat. No. 3,900,554). In U.S. Pat. No. 3,900,554, the following two methods are briefly disclosed. The first one is a method of selectively reducing $NO_x$ by contacting the combustion exhaust gas containing $NO_x$ with ammonia or an ammonia precursor in the presence of sufficient oxygen at 1600° to 2000° F. (871° to 1093° C.). The second one is a method of selectively reducing $NO_x$ by contacting the combustion exhaust gas with oxygen, ammonia and a reducing agent selected from the group consisting of hydrogen and the other reducing agents at 1300° to 2000° F. (704° to 1093° C.).

These methods are preferable from the viewpoint of the industrial operation because of the broad temperature range in the operation. In order to increase the $NO_x$ removal rate, it is preferable to increase the mole ratio of ammonia to $NO_x$. However, when the mole ratio of ammonia to $NO_x$ is high, the following disadvantages may be caused. (a) A secondary pollution (toxicity and bad smell) is caused by the unreacted ammonia. (b) Combustion exhaust gases formed by combustion of mineral oils contain sulfur oxides ($SO_x$) and ammonium salts such as ammonium hydrogensulfate is formed and adhered in a heat-exchanger by the reaction of $SO_3$ in $SO_x$ with the unreacted ammonia whereby the disadvantages of a corrosion of the heat-exchanger or a clogging of passage are caused.

On the other hand, the inventors have been studied the method of removing $NO_x$ by treating the combustion exchange gas containing $NO_x$ with oxygen and ammonia source at high temperature and the method of removing $NO_x$ under adding hydrogen. As the result, the conditions for imparting high $NO_x$ removal rate are found beside the range of the conditions disclosed in U.S. Pat. No. 3,900,554.

In the second method disclosed in U.S. Pat. No. 3,900,554, hydrogen or the other reducing agent is combined to the combustion exhaust gas. When hydrogen is used, hydrogen causes to disadvantageously decrease the selectively for reducing $NO_x$ with ammonia. When excess of hydrogen is combined, there is a possibility to convert $NH_3$ into $NO_x$ rather than the desired reaction for reducing $NO_x$ with ammonia. Accordingly, it has been considered that the mole ratio of $H_2/NH_3$ is lower than 10 especially lower than 3.

In accordance with the data of Table 3 in the examples of U.S. Pat. No. 3,900,554, the mole ratio of $H_2/NH_3$ was 2.4. As the result, the $NO_x$ removal rate was 0° to 1200° F. (648° C.) while $NO_x$ removal was found at 1300° F. (704° C.) and was remarkably found at 1400° F. (760° C.). When the mole ratio of $H_2/NH_3$ is constant, the $NO_x$ removal rate increases with increasing amounts of $NH_3$ charged.

SUMMARY OF THE INVENTION

It is an object of the present invention to provide a method of treating a combustion exhaust gas containing nitrogen oxides by effectively removing $NO_x$ in the condition for easy operation control using relatively large amount of ammonia in the presence of oxygen and then effectively removing the residual ammonia under advantageous industrial operation.

The object of the present invention has been attained by combining a first step of removing nitrogen oxides by treating a mixture of the exhaust gas, oxygen and ammonia in the absence of hydrogen or in the presence of lower than 10 mole ratio of hydrogen to ammonia at a temperature from 700° C. to 1300° C. and a second step of adjusting a mole ratio of hydrogen to ammonia in the pretreated exhaust gas to higher than 3 and treating the mixed gas at a temperature from 490° C. to 700° C.

DETAILED DESCRIPTION OF THE PREFERRED EMBODIMENTS:

In accordance with the inventors' findings, when the mole ratio of $H_2/NH_3$ is higher than 3 preferably higher than 5 especially higher than 10, in the removal of $NO_x$ by treating the exhaust gas containing $NO_x$ in the presence of oxygen, ammonia and hydrogen at high temperature to prevent pollution, excellent results can be achieved in a range of 490° C. to 700° C. as the $NO_x$ removing curve.

Under the condition, there is substantially no trouble to convert ammonia into $NO_x$ as stated in the reference even though the mole ratio of $H_2/NH_3$ is high. Moreover, ammonia remarkably contributes to effectively remove $NO_x$ and the residual unreacted ammonia is remarkably reduced. This is an unexpected phenomenon.

The invention is accomplished by the findings.

The process of the present invention comprises the above-mentioned first step and second step.

In the first step, relatively large amount of ammonia is used at the temperature in broad range for easy control of the operation to effectively remove $NO_x$ and in the second step, the unreacted ammonia and the residual $NO_x$ in the pretreated exhaust gas are removed to cause substantially no pollution at lower than the temperature in the first step in the presence of large amount of hydrogen without converting ammonia to $NO_x$.

The steps will be described in detail.

The concentration of oxygen in total mixed gas of the combustion exhaust gas containing $NO_x$ in the first step is higher than 0.1% by volume, preferably in a range of about 2 to 10% by volume. In the combustion exhaust gas containing $NO_x$ usually contains oxygen. Thus, sometimes, oxygen is added for example by charging air. Ammonia is charged at a mole ratio of higher than 0.6 preferably 2 to 10 to $NO_x$ in the exhaust gas.

When hydrogen is used in the first step, the mole ratio of $H_2/NH_3$ should be lower than 10 preferably lower than 3.

In order to remove $NO_x$ in the first step, it is necessary to maintain the temperature of the combustion exhaust gas at higher than 700° C. especially about 800° to 1100° C.

When hydrogen is used, relatively low temperature in the above-mentioned range is preferable. Thus, in order to complete the reaction for a short period, the conventional method of uniformly mixing gases can be preferably employed so as to uniformly distribute and contact the gases and to give uniform temperature for a short period.

The residence time of the combustion exhaust gas is longer than 0.018 second preferably longer than 0.072 second especially longer than 0.18 second.

The concentrations of unremoved $NO_x$ and ammonia in the gas treated in the first step are dependent upon the type of the combustion exhaust gas and the condition of the first step. For example, in the treated exhaust gas formed in a conventional boiler which has been treated in the first step, the concentration of the unremoved $NO_x$ was in a range of about 10 to 50 ppm by volume (hereinafter ppm means by volume), and the concentration of ammonia is in a range of about 50 to 200 ppm by volume and the concentration of oxygen is in a range of about 2 to 5% by volume. The treated exhaust gas is further treated in the second step.

In the second step, hydrogen is added in a specific concentration under controlling the feed of hydrogen in the position at a temperature of the exhaust gas in a range of 490° to 700° C.

Thus, as the temperature condition, higher temperature is preferable for decomposing ammonia, however, the conversion of ammonia into nitrogen oxides also increases depending upon rising the temperature. On the other hand, the temperature in the second step can be lowered depending upon increasing the mole ratio of $H_2/NH_3$. Accordingly, the temperature in the second step is preferably in a range of 550° to 680° C.

The amount of hydrogen should be more than 3 moles per 1 mole of ammonia in the mixed gas. Higher amount of hydrogen attain advantageous result for the ammonia decomposing rate and the $NO_x$ removal rate. Thus, the feed of too much hydrogen is not economical and causes disadvantageous effect to the substance of the apparatus. Accordingly, the mole ratio of $H_2/NH_3$ is preferably higher than 5 especially in a range of 10 to 50.

Hydrogen gas stored in a bomb can be fed through a pipe into the specific position in the second step as the hydrogen source. It is also possible to produce hydrogen by decomposing a hydrogen source which forms hydrogen by a thermal decomposition, a catalytic reaction such as ammonia and methanol, in a pipe system and to feed the resulting hydrogen into the specific position.

The method of producing hydrogen by decomposing the hydrogen source is preferable to effectively prevent an accident of explosion of hydrogen because a stored hydrogen gas may cause the explosion as high temperature of the combustion exhaust gas.

In one method of producing hydrogen by decomposing ammonia, ammonia can be decomposed to form hydrogen and nitrogen by heating, at 600° to 1200° C., a steel pipe through which ammonia or a mixture of ammonia and an inert gas is passed.

In the other method of producing hydrogen from ammonia, ammonia can be decomposed to form hydrogen and nitrogen by contacting it with a platinum catalyst at 550° to 1000° C.

The concentration of oxygen in the second step is more than 0.1% preferably in a range of 2 to 15% by volume. The ammonia decomposing rate is higher depending upon increasing the concentration of oxygen. Accordingly, oxygen or an oxygen containing gas such as air can be added in the second step if desired.

The residence time of the combustion exhaust gas in the second step can be longer than 0.01 second. The $NO_x$ removal rate and the ammonia decomposing rate are increased depending upon longer residence time. However, in order to prolong the residence time, the size of the apparatus should be increased and the temperature is difficultly maintained. Accordingly, the residence time is preferably longer than 0.1 second especially in a range of 0.2 to 10 seconds. In order to improve the efficiency under the short residence time, it is necessary to rapidly mix the gases.

The gases for contacting with the combustion exhaust gas containing $NO_x$ are uniformly mixed with the combustion exhaust gas in speedy, for example, by feeding hydrogen and ammonia from many positions distributed on the sectional area of the gas flow, whereby the mutual contact of the gases is improved to shorten the residence time, and the increase of the size of the apparatus is preferably avoided.

In the first step of the method of the invention, the range of temperature can be remarkably broad, and expensive hydrogen is not always needed, advantageously.

Thus, in the industrial apparatus, in order to improve the $NO_x$ removal rate, it is necessary to give high mole ratio of $NH_3/NO_x$ because of limitations of uniform dispersion of ammonia and the other gas and the reaction time. Accordingly, the concentration of the residual ammonia is high to cause the secondary pollution. When the combustion exhaust gas contains $SO_x$, the salts are formed by the reaction of ammonia with $SO_x$ especially $SO_3$ in the heat exchanger to cause clogging in the gas passage and corrosion of the apparatus.

However, in accordance with the method of the invention, the concentration of the residual ammonia can be remarkably decreased by the combination of the second step to overcome the above-mentioned disadvantages.

That is, the concentration of ammonia in the finally discharged exhaust gas can be remarkably decreased in the second step and accordingly, enough amount of ammonia for removing $NO_x$ in high efficiency can be used in the first step. The method of the invention is remarkably advantageous as a method of removing $NO_x$ from the combustion exhaust gas to prevent a pollution of $NO_x$.

EXAMPLE 1

In a horizontal combustion furnace which had an inner diameter of 300 mm and a length of 3 m and had a refractory lining chamotte brick, a fuel oil was fed at a rate of 5 liter/hour and a primary air was fed at a rate of 3 Nm³/hour to uniformly mix them through a burner in the horizontal direction into the combustion furnace and the fuel oil was burnt under feeding the secondary air at a rate of 60 to 80Nm³/hour. In the combustion exhaust gas, 200 ppm of $NO_x$ was included.

A refractory porcelain perforated plate was disposed at the position at a temperature of about 1000° C. to which flame was reached. In the position at a temperature of about 900° C. in the downstream of the perforated plate in the combustion chamber, ammonia was fed to be 1000 ppm of the concentration of ammonia. As the result, the concentration of $NO_x$ was 15 ppm and the concentration of ammonia was 120 ppm at the outlet of the combustion chamber.

In the position at a temperature of about 650° C. in the downstream of the ammonia feeding position, hydrogen was fed to be 600 ppm of the concentration of hydrogen. As the result, the concentration of $NO_x$ was decreased to 5 ppm and the concentration of ammonia was decreased to 20 ppm at the outlet of the combustion furnace.

EXAMPLE 2

In accordance with the process of Example 1 except feeding hydrogen to be 2500 ppm of the concentration of hydrogen in the position at a temperature of about 600° C. in the downstream of the ammonia feeding position, the test was repeated.

As the result, the concentration of $NO_x$ was lower than 5 ppm and the concentration of ammonia was 10 ppm at the outlet of the combustion chamber.

Reference 1

In accordance with the process of Example 1 except feeding hydrogen to be 2500 ppm of the concentration of hydrogen in the position at a temperature of about 850° C. in the downstream of the ammonia feeding position, the test was repeated.

As the result, the concentration of $NO_x$ was 45 ppm though the concentration of ammonia was decreased to lower than 5 ppm. The purpose of removing $NO_x$ was not attained by feeding hydrogen in this position.

What is claimed is:

1. A method of removing nitrogen oxides from a combustion exhaust gas containing nitrogen oxides which comprises:
    a first step of reducing nitrogen oxides by treating a mixture of the exhaust gas, oxygen and ammonia in the absence of hydrogen or in the presence of hydrogen, wherein the mole ration of hydrogen to ammonia is less than 10, at a temperature from 700° C. to 1300° C. and a second step of adding hydrogen to said treated exhaust gas at a point wherein the temperature of said exhaust gas is 550° C. to 680° C. in an amount sufficient to yield a mole ratio of hydrogen to ammonia in the exhaust gas of from 10 to 50 and maintaining a residence time of from 0.2 to 10 seconds in said second step.
2. The method of claim 1, wherein the concentration of oxygen in the combustion exhaust gas in the first step is in the range of 0.1 to 10% by volume relative to the total volume of the mixed gas.
3. The method of claim 1, wherein the mole ratio of the amount of ammonia to the amount of nitrogen oxides in the combustion exhaust gas in the first step is in the range of 0.6 to 10.
4. The method of claim 1, wherein the amount of hydrogen added in the second step is more than 5 moles per 1 mole of ammonia in the mixed gas in the second step.

* * * * *